United States Patent [19]

Rathburn et al.

[11] 3,763,694

[45] Oct. 2, 1973

[54] ULTRASONIC INSPECTIONS USING POLYMERIC MATERIALS AS COUPLANTS

[75] Inventors: Richard P. Rathburn, Richmond; Garth M. Stanton, Pinole, both of Calif.

[73] Assignee: Chevron Research Company, San Francisco, Calif.

[22] Filed: Mar. 20, 1969

[21] Appl. No.: 809,029

[52] U.S. Cl. .................................. 73/71.5, 73/67.5
[51] Int. Cl. ............................................ G01n 24/00
[58] Field of Search .................... 73/67.5–67.9, 71.5

[56] References Cited
UNITED STATES PATENTS

| | | | |
|---|---|---|---|
| 3,074,267 | 1/1963 | Martin | 73/67.5 |
| 3,242,723 | 3/1966 | Evans | 73/67.8 |
| 3,394,586 | 7/1968 | Cross | 73/71.5 |
| 3,423,991 | 1/1969 | Collins | 73/67.5 |
| 3,497,728 | 2/1970 | Ostrofsky et al. | 73/67.9 |

*Primary Examiner*—Herbert Goldstein
*Attorney*—A. L. Snow

[57] ABSTRACT

A process is disclosed for making ultrasonic inspections of high surface temperature objects by using a polymeric material as a couplant. The polymeric materials are specifically defined in terms of thermal characteristics. Surface temperatures of the object at the point of inspection may be 300° – 1,100° F. or higher.

5 Claims, No Drawings

ULTRASONIC INSPECTIONS USING POLYMERIC MATERIALS AS COUPLANTS

BACKGROUND OF THE INVENTION

This invention relates to processes for transmitting ultrasonic waves into solid materials. More particularly, it relates to such processes for transmitting waves into solid materials having high surface temperatures.

In recent years, ultrasonic processes for nondestructively examining and measuring various properties of solid materials have become extensively used. Ultrasonic processes may be used in measuring thicknesses of solid materials such as steel ship hulls, oil refinery reaction vessels, piping or columns, or plates or beams of materials such as those used in aircraft. Ultrasonic examination is also used to detect flaws in the interior of solid materials such as thick steel plates or welds.

In a typical ultrasonic examination process, one employs a transducer containing an ultrasonic wave generating source, a receiving device to receive the ultrasonic wave reflected from walls or other surfaces of the solid body being examined, and some sort of measurement-indicating device to indicate to the operator the particular quantity being measured, which may be, for instance, the depth or width of a flaw within the solid object being examined. The receiver may be part of the transducer assembly or it may be a separate device. In practice, the ultrasonic waves generated by the transducer pass through the transducer face into the solid material and are reflected from various surfaces within the material. These surfaces may be flaws within the material, welded joints abutting the material, or simply outer surfaces of the material. The reflected wave is detected by the receiver and the signal generated in the receiver upon detection of the wave is passed to the indicating device where it is converted into a signal from which the operator can determine the particular quantity or measurement he seeks. Most often the indicating device is an oscilloscope and the reflected wave signal appears as a peak on the oscilloscope screen. Alternatively, the indicating device signal may appear as the deflection of a needle on a meter, a line on a graph, or even a series of numbers on a printed sheet where the receiving device is connected to a digital output device.

It is found in practice that because of the normal irregularities of the surfaces of the object to be examined and the transducer face, good contact between the transducer face and the object usually cannot be obtained simply by pressing the transducer face against the object. While there will be a number of points of contact between their two surfaces, there will also be numerous points where the surfaces do not touch, thus leaving air gaps between the two surfaces. These air gaps prevent smooth transmission of the ultrasonic waves from the transducer face into the solid body and cause the reflected wave pattern detected by the receiver to be extremely distorted, thus preventing the operator from obtaining satisfactory data from his measurements.

To overcome this problem, couplants are used in ultrasonic examination processes. A couplant is a relatively deformable material which is placed between the surfaces of the transducer and the solid material. The couplant fills substantially all the spaces between the two surfaces and essentially eliminates the troublesome air gaps. The ultrasonic waves pass smoothly from the transducer face, through the couplant, and into the solid body; and where the receiver is an integral part of the transducer, the reflected waves pass smoothly out of the solid material, back through the couplant, and into the transducer.

Most ultrasonic measurements are made on materials which are at ambient or slightly elevated temperatures. These "slightly elevated" temperatures may be as high as about 300° F. At ambient temperatures and temperatures up to about 200° F., a number of common materials such as water and light lubricating oil make satisfactory couplants. At higher temperatures, up to about 300° F., more viscous materials such as petroleum and silicone greases have been used.

Above 300° F., however, these materials are unsatisfactory for a number of reasons. Some, such as water, boil off or evaporate rapidly, while others such as the greases become extremely fluid and run. These obviously cannot be used on vertical or overhead surfaces. Further, many develop gas bubbles within the couplant and these gas bubbles distort the ultrasonic transmission in much the same way as do air gaps. Consequently, in most cases, ultrasonic inspection processes have been limited to applications at temperatures below about 300° F.

This low temperature limitation has not particularly inhibited use of ultrasonic processes in a number of fields, such as aircraft construction and some phases of ship construction. It has, however, severely limited their usefulness in such fields as oil refining, chemical production, weld inspection, and fabrication of heavy metal plates and beams. This is because many operations in these fields occur at high temperatures, i.e., temperatures above about 300° F. Typical are oil refinery processes in which reaction vessels, transfer pipes, furnaces, and much other metal apparatus operate at these and higher temperatures.

Operators of such high-temperature processes have, for many years, sought a method whereby the high-temperature apparatus could be inspected for flaws, metal lost by corrosion, and other defects, while remaining in service and being operated at the high temperatures. In most cases, such inspection has not been possible and the operator has been forced to remove the apparatus from service and cool it down to a temperature of 300° F. or lower to permit the ultrasonic inspection with conventional couplants. Obviously, this has been an unsatisfactory procedure because of the loss of operating time.

Three methods have been suggested of inspecting high-temperature apparatus while the apparatus is operating. In the first of these, water is continuously pumped through the transducer head into the gap between the transducer face and the high-temperature surface, serving both as a couplant and a coolant. The water turns to steam almost immediately upon contacting the hot metal surface, but if the water volume is great enough, the conversion to steam is delayed just long enough for relatively rough measurements to be obtained by the ultrasonic device. This method, however, is severely deficient in that it requires considerable extra apparatus to provide the water flow and a highly complex transducer head, incorporating means for the water to pass through. It also subjects the operator to the hazards of working in an atmosphere of high-temperature steam. Finally, on some materials the quenching effect of the water is undesirable.

In another method, it has been proposed to use molten metal or fused salt as the couplant at high temperatures. This has the obvious disadvantage of requiring special handling means to contain the molten metal or fused salt and to protect the operator from the serious hazards of working with these materials.

The third method proposed employs, as a couplant, an organic material. This is placed against the hot surface where it rapidly is burned to a substantially carbonaceous layer. The carbonaceous layer then serves as the couplant. This has been found to be relatively unsatisfactory, however, for it permits only one attempt by the operator to obtain good transducer-to-metal surface contact. If the transducer face is not precisely placed against the carbonaceous couplant on the first attempt, the carbonaceous layer is disturbed to such an extent that it cannot further serve as a couplant. Consequently, if the operator does not place the transducer face against the couplant at precisely the correct angle on the first try, he cannot remove the transducer and make a second attempt. This is obviously a disadvantage, since in many cases ultrasonic measurements are made in surroundings where the operator must work in a cramped or awkward position, and so cannot be expected to place the transducer in position accurately on the first attempt.

SUMMARY

We have now discovered the present process by which high-temperature ultrasonic measurements may be made rapidly and with considerable ease, safety to the operator, and reproducibility. Further, measurements may be made on nonhorizontal surfaces, such as vertical or overhead pipes or vertical reaction vessels without encountering the problems of couplants which run or drip from the spot onto which they are placed.

In summary, this invention is a process which comprises making an ultrasonic inspection of an essentially solid body from a surface point on that body where the surface point has a temperature designated $T_s$; wherein ultrasonic waves are transmitted from the face of a transducer through a couplant into the body at the surface point and undistorted reflections of the waves are detected after emerging from the body; and further wherein A) the couplant is a polymeric material 1) having a glass transition temperature less than $T_s$ and a distortion temperature greater than both 300° F and $T_s$; and 2) which is deformable at $T_s$ to substantially fit the contours of both the transducer face and the surface point; and B) $T_s$ is greater than 300° F.

DETAILED DESCRIPTION OF THE INVENTION

In its broadest form, this invention is a process which comprises making an ultrasonic inspection of an essentially solid body from a surface point on that body where the surface point has a temperature designated $T_s$; wherein ultrasonic waves are transmitted from the face of a transducer through a couplant into the body at the surface point and undistorted reflections of the waves are detected after emerging from the body; and further wherein A) the couplant is a polymeric material 1) having a glass transition temperature less than $T_s$ and a distortion temperature greater than both 300° F and $T_s$; and 2) which is deformable at $T_s$ to substantially fit the contours of both the transducer face and the surface point; and B) $T_s$ is greater than 300° F. Preferred embodiments of this invention will be described below.

A principal feature of this invention is the use of a specific type of polymeric material as a couplant. This type of polymeric material is defined by characteristics described in detail below. Its usefulness in the process of this invention is based on its ability to transmit ultrasonic waves without distortion at temperatures above 300° F. In a preferred embodiment, these materials transmit ultrasonic waves without distortion at temperatures above 400° F., and, in a more preferred embodiment, at temperatures above 600° F.

In the process of this invention, the temperature of interest is the surface temperature of the solid body at the point at which the body is to be examined ultrasonically. For convenience, this temperature will hereinafter be referred to as $T_s$. In the broadest form of this invention, $T_s$ is greater than 300° F. In a preferred embodiment, $T_s$ is greater than 400° F., and in a more preferred embodiment, greater than 600° F.

An important characteristic of the polymeric material is its "deformability." In order to be useful in this process, the polymeric material must be sufficiently deformable at $T_s$ that it substantially fits all the contours of both the transducer face and the surface of the solid body at the surface point of examination. It must fill the space between the body surface and the transducer face without creating any bubbles or gaps in the couplant itself. It must also adhere to the surface of the object being examined if that surface is rounded or non-horizontal.

Directly related to the deformability of the polymeric material is its glass transition temperature. The glass transition temperature of a polymer is defined on page 26 of the 1968 edition of the Modern Plastics Encyclopedia (McGraw-Hill Publishing Company), as the temperature below which molecular chain motion in the polymer is frozen in. Above this temperature there is sufficient energy to permit motion and undulations in the polymer chain. Below the glass transition temperature the polymeric materials are stiff, hard and often brittle.

In order to guarantee the deformability of the polymeric material it is required that the glass transition temperature of the polymeric material be less than $T_s$. If the glass transition temperature of the polymeric material is higher than $T_s$, the polymeric material will remain hard and cannot be deformed sufficiently to act as a satisfactory couplant.

Another principal characteristic required of the polymeric material is what will herein be termed the "distortion temperature." This is defined as the temperature above which the polymeric material develops physical characteristics which distort the ultrasonic waves passing through the couplant and thus prevent the collection of reliable ultrasonic examination data. This occurrence of distortion-causing characteristics may take any one of several forms: most commonly the polymeric material melts, chars, or flames. The polymeric material is deemed to have melted when it becomes fluid enough to run relatively freely or when gaseous bubbles begin to form in the polymeric material. It is deemed to have charred when a layer of carbon has been formed of sufficient thickness such that the surface region of the polymeric material no longer has a tacky consistency. The flaming point is, of course, apparent. The occurrence of the distortion-producing characteristic, however, is not limited to the melting, charring, or flaming of the polymeric material. All other forms of change of the physical characteristics of the polymeric material which cause distortion of the ultrasonic wave are intended to be included within this definition. This would include such occurrences as oxidation of the surface layer of the polymer where such oxidation causes distortion of the ultrasonic waves.

Operation of the process of this invention, as practiced at our direction by the Equipment Inspection Section of the Standard Oil Company of California Refinery at Richmond, California, is basically similar to the operation of processes for making ultrasonic measurements at temperatures below 300° F. Because the transducer itself must be protected from heat, how-ever, a heat sink or "delay line" is usually placed between the hot surface and the actual face of the transducer. The presence of this delay line does not affect the operation of the process of this invention. Consequently, throughout this specification and in the claims, the term "face of the transducer" will be understood to signify the face of the delay line where appropriate operational requirements call for use of a delay line.

In practice, the operator of the ultrasonic apparatus locates the exact surface point on the vessel, pipe, plate, or other solid object where he wishes to make his inspection. He places the polymeric couplant on the object's surface at that point. He then waits a short time, generally no more than a few seconds, for the heat from the surface to soften the couplant. (Because of the adhesive properties of the polymeric couplant, the operator may, if desired, wait for several minutes after the couplant softens before continuing with the examination.) He then pushes the face of the transducer against the softened couplant. This forces the deformable couplant into the contours of both the transducer face and the object's surface, and completely fills the gap between the two. Ultrasonic waves generated by the transducer are then transmitted through the transducer face and couplant into the solid body.

The reflected waves are detected as they emerge from the body, either by the transducer itself (now acting as a receiver) or by a separate receiver in contact with the object through a second couplant. This second couplant may be a polymeric material if the surface temperature at the reception point is greater than 300° F. If it is a polymeric material, it may be the same or a different polymeric material as that which is in contact with the transducer. If the surface temperature at the reception point is less than 300° F., a conventional couplant may be used. The reflected wave is monitored by a visual display means which has usually been pre-calibrated to display the desired measurement directly. For instance, if an oscilliscope is used as the display means, the separation of reflected wave peak heights can be calibrated to indicate thickness of a pipe wall directly in inches or centimeters.

We have found it most convenient to use two men to operate the process of this invention, although in many cases one man can easily perform the operations. When two men are used, the power source for the transducer and receiver and the display means are grouped in a central location (we have collected these in a mobile van) and the transducer and receiver are located at the inspection site remote from that central location but connected thereto by electrical cables. One man monitors the equipment at the central location while the other, encumbered only by the couplant, transducer, and receiver, and their trailing cables, makes the measurement at the desired inspection site. Since transducer/receiver combinations housed in containers having external length, width, and depth each less than one inch are commercially available, and, as will be discussed below, the couplant is easily carried, the man making the actual inspection can easily work in confined spaces. Further, not being burdened with heavy or bulky equipment, he can often reach points (by climbing, crawling, etc.) that would be inaccessible to a man who was so burdened.

The polymeric materials may be used in many convenient forms. At ambient temperatures they are solid, and those commercially available are often in the form of large thin sheets. We have found it convenient to use the material in small strips. The actual size will depend on the largest dimension of the transducer face. We have used a transducer with a 1/2 inch diameter face; the couplant strips used in conjunction with this instrument were approximately 4–6 inches long and one-half inch wide.

Thickness of the polymeric material should be minimal, providing only enough thickness to fit the contours of the transducer face and object surface and maintain a small, couplantfilled separation between them. Thicknesses should be in the range of about 0.001–0.2 inches, with 0.004–0.1 inches preferred.

Optimum overall size of the couplant for ease of use is based largely on the poor heat transfer characteristics of the polymeric material. Since heat from the object's surface flows only slowly through the material, the couplant should be thin to permit rapid softening of entire thickness of the couplant adjacent the surface inspection point. By having a piece of couplant several times longer than its width, however, the operator can comfortably hold one end of the couplant strip (which is cool) while the other end is in contact with the heated object surface.

Where the couplant is used in the form of a small rectangular thin strip, the operator can easily carry several strips in a pocket or pouch and can make numerous inspections before exhausting his supply of couplant. A single strip of couplant may often be reused several times if it does not adhere so strongly to an object surface that it is torn apart on attempted removal. As an alternative, the couplant, if it is sufficiently flexible at ambient temperatures, may be in the form of a long narrow thin strip, coiled such that the operator may pull off whatever length of material he needs for a particular inspection.

A number of polymeric substances have been tested and have been found satisfactory for use in this process. Each has a temperature range in the region above 300° F. at which it is most satisfactory for use.

These polymers generally have number average molecular weights in the range of 1,000–100,000.

Suitable polymeric materials for use as couplants in the process of this invention include polyester resins, such as the poly(ethylene terephthalate) polymer commercially available under the trademark "Mylar;" polysulfone resins, such as the commercially available polymer having the phenylene-isopropylidene-ether-sulfone structure described on page 284 of the aforementioned Modern Plastics Encyclopedia; siliceous polymers, such as poly(dimethyl siloxane) and poly(diphenyl siloxane); and polycarbonate resins, such as the carbonate-linked polymeric materials produced by reacting phosgene and p,p'-isopropylidenediphenol and commercially available under the trademark "Lexan." These are examples only, and are not meant to be limiting, for any polymeric material with the claimed characteristics will be operative in the process of this invention.

Typical applications of the process of this invention are illustrated in the Table below as Examples 1 through 21. Each of these examples describes an ultrasonic measurement made on a particular piece of oil refinery process equipment. In most cases the purpose of the ultrasonic inspection was to detect flaws or cracks in refinery piping or to measure the wall thickness of piping to determine corrosion damage. Measurements were made using the inspection techniques described above. Strips of polymeric material about 12 inches long by 1/2 inch wide by 0.05 inch thick were used.

In the Table below, the particular type of refinery apparatus examined is described. The surface temperature at the point of inspection is given and the polymeric couplant used is also listed. Nominal diameters of the various pipes inspected ranged from 3 inches to 16 inches. The term "FCC" is an abbreviation for fluid catalytic cracker. All pieces of equipment listed were in full service while being examined.

TABLE

| Example | Apparatus Examined | Surface Temp., F° | POLYMERIC COUPLANT |
|---|---|---|---|
| 1 | Hydrocracker furnace crossover lines | 1100 | Polysulfone |
| 2-6 | Hydrocracker furnace crossover lines | 962 | Polysulfone |
| 7 | Coker outlet lines | 950 | Polysulfone |
| 8 | Thermal cracker evaporator column bottoms line | 780 | Polysulfone |
| 9 | Thermal cracker fractionator column side cut line | 750 | Polysulfone |
| 10 | FCC fractionator bottoms line | 650 | Mylar |
| 11-15 | FCC fractionator bottoms reflux lines | 650-665 | Mylar |
| 16-17 | FCC fractionator side cut lines | 600 | Mylar |
| 18-20 | FCC fractionator side cut lines | 530 | Mylar |
| 21 | FCC fractionator bottoms reflux line | 390 | Mylar |

We have found it most satisfactory to use polyester, polycarbonate, and polysiloxanes couplants at the lower temperatures (i.e., 300°-700° F.) and the polysulfone couplants at the higher temperatures (i.e., 600°-1,100° F.).

We claim:

1. In a process for ultrasonically inspecting an essentially solid body from a surface point on said body at which the surface temperature is designated $T_s$, wherein $T_s$ is greater than 300° F., which comprises emitting ultrasonic waves from a transducer, passing said waves from the face of said transducer through a couplant into said body at said surface point, and receiving and interpreting the reflections of said waves after their emergence from said body; the imporvement wherein said couplant is a polyester polymeric material having a glass transition temperature less than $T_s$ and a distortion temperature greater than $T_s$, and which is deformable at $T_s$ to substantially fit the contours of both said transducer face and said surface point.

2. The process of claim 1 wherein $T_s$ is greater than 400° F.

3. The process of claim 1 wherein said polymeric material is a polyester.

4. The process of claim 3 wherein said polyester is a polymer of ehtylene terephthalate.

5. The process of claim 4 wherein said distortion temperature is not greater than 700° F.

* * * * *